(12) United States Patent
Sudou et al.

(10) Patent No.: US 10,422,676 B2
(45) Date of Patent: Sep. 24, 2019

(54) FLOW RATE METER

(71) Applicant: DENSO CORPORATION, Kariya, Aichi-pref. (JP)

(72) Inventors: Akiyuki Sudou, Kariya (JP); Kengo Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 15/132,575

(22) Filed: Apr. 19, 2016

(65) Prior Publication Data
US 2016/0312753 A1 Oct. 27, 2016

(30) Foreign Application Priority Data

Apr. 21, 2015 (JP) .................................. 2015-86903

(51) Int. Cl.
*G01F 1/684* (2006.01)
*F02M 35/10* (2006.01)
*G01F 1/692* (2006.01)
*G01F 5/00* (2006.01)

(52) U.S. Cl.
CPC ....... *G01F 1/684* (2013.01); *F02M 35/10386* (2013.01); *G01F 1/6842* (2013.01); *G01F 1/6845* (2013.01); *G01F 1/692* (2013.01); *G01F 5/00* (2013.01)

(58) Field of Classification Search
CPC .......... G01F 5/00; G01F 1/6842; G01F 1/684; F02M 35/10386
USPC ..................................................... 73/114.32
See application file for complete search history.

(56) References Cited

U.S. PATENT DOCUMENTS

| 4,420,972 A * | 12/1983 | Kuroiwa .................. G01F 1/68 73/114.32 |
| 4,517,837 A * | 5/1985 | Oyama ................. F02D 41/187 73/114.34 |
| 5,563,340 A * | 10/1996 | Clowater .............. G01F 1/6842 73/114.34 |
| 5,804,718 A * | 9/1998 | Nagasaka ............. G01F 1/6842 73/114.34 |
| 2007/0062276 A1 | 3/2007 | Konzelmann et al. |
| 2012/0240668 A1* | 9/2012 | Goka ..................... G01F 1/6842 73/114.32 |
| 2013/0019675 A1* | 1/2013 | Ban ........................... G01F 5/00 73/202 |
| 2013/0192354 A1* | 8/2013 | Kaifu .................... G01M 15/02 73/114.32 |

FOREIGN PATENT DOCUMENTS

DE 10 2008 042 807 4/2010
DE 102008042807 A1 * 4/2010 .......... G01F 1/6842

* cited by examiner

*Primary Examiner* — Marrit Eyassu
(74) *Attorney, Agent, or Firm* — Nixon & Vanderhye P.C.

(57) ABSTRACT

A flow rate meter has (i) a housing therein defines a bypass path in which a part of the main flow flows, and (ii) a flow rate sensor that is arranged in the bypass path. The housing has a sidewall arranged to extend along a main flow direction. The bypass path has, as an outlet, a through-hole that is defined in the sidewall. The flow rate meter further has a plate member that is arranged to face the sidewall and defines a space into which a part of the main flow flowing outside of the housing flows. The plate member is arranged parallel with the sidewall and intersects with a center line that is perpendicular to the main flow direction and passes through a center of the through-hole.

20 Claims, 10 Drawing Sheets

FLOW RATE METER

CROSS REFERENCE TO RELATED APPLICATION

This application is based on Japanese Patent Application No. 2015-086903 filed on Apr. 21, 2015, the disclosure of which is incorporated herein by reference in its entirety.

TECHNICAL FIELD

The present disclosure relates to a flow rate meter.

BACKGROUND

A flow rate meter is known to have a housing and a flow rate sensor. The housing defines a bypass path into which a part of a main flow flows. The flow rate sensor is arranged in the bypass path. Patent Document 1 (DE 102008042807 A) discloses a flow rate meter in which the housing has, as an outlet of the bypass path, a through-hole that is provided with an outer wall of the housing. The outer wall of the housing extends in a main flow direction in which the main flow flows in the housing, and the through-hole is open in a direction approximately perpendicular to the main flow direction.

However, according to experiments conducted by the inventors of the present disclosure, when the flow rate meter has the above-described structure, a vortex may occur in the main flow on a downstream side of the outlet of the bypass path since a flow from the outlet may be separated when being joining the main flow. Accordingly, it is required to reduce a separation of the flow flowing from the outlet of the bypass path when being joining the main flow.

According to Patent Document 1, the flow rate meter has a guide wall 136 and a guide plate 142 to restrict a spatial diffusion of the flow that occurs in a separation area located on the downstream side of the outlet in the main flow direction. However, the guide wall 136 and the guide plate 142 do not restrict an occurrence of the separation of the flow, although the guide wall 136 and the guide plate 142 restrict the spatial diffusion of the flow after the separation occurs.

SUMMARY

The present disclosure addresses at least one of the above issues. Thus, it is an objective of the present disclosure to provide a flow rate meter with which a flow separation that occurs when a flow from an outlet of a bypass path joins a main flow can be reduced.

A flow rate meter has (i) a housing that is arranged in an intake passage in which a main flow of air drawn into an internal combustion engine flows, the housing that therein defines a bypass path in which a part of the main flow flows, and (ii) a flow rate sensor that is arranged in the bypass path.

The main flow flows in the intake passage in a main flow direction. The housing has a sidewall as an outer wall, and the sidewall is arranged to extend along the main flow direction. The main flow direction is a base direction based on which an upstream side and a downstream side are defined. The bypass path has, as an outlet, a through-hole that is defined in the sidewall and open in a direction approximately perpendicular to the main flow direction.

The flow rate meter further has a plate member that is arranged to face the sidewall and defines a space into which a part of the main flow flowing outside of the housing flows, the space that is located between the sidewall and the plate member. The plate member is arranged parallel with the sidewall and intersects with a center line that is perpendicular to the main flow direction and passes through a center of the through-hole.

According to the above-described structure, the plate member can change a flow direction of air flowing from the through-hole to a direction parallel with the sidewall. That is, the flow of air flowing from the through-hole is bent to a direction that is along the main flow direction and flows toward the downstream side with the main flow flowing in the space defined between the sidewall and the plate member.

As a result, a flow of air flowing from the outlet of the bypass path can flow along the housing together with the main flow, and the flow separation that occurs when the flow from the outlet joins the main flow can be reduced. That is, the flow from the outlet is hardly separated from the sidewall on the downstream side of the through-hole.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A flow rate meter 1 according to a first embodiment will be described referring to FIGS. 1 to 5. The air flow meter 1 is, for example, an air flow meter that measures an intake air volume of air drawn into an internal combustion engine (i.e., an engine) for a vehicle such as a car. The air flow meter 1 is attached to a duct D that defines an intake passage F (i.e., a suction passage) that delivers air to the engine. The duct D has an attachment hole Da that is open at a wall of the duct D, and the flow rate meter 1 is inserted to the duct D from the attachment hole Da.

The flow rate meter 1 includes an engagement portion 2, a housing 3, and a flow rate sensor 4.

Figure 1:
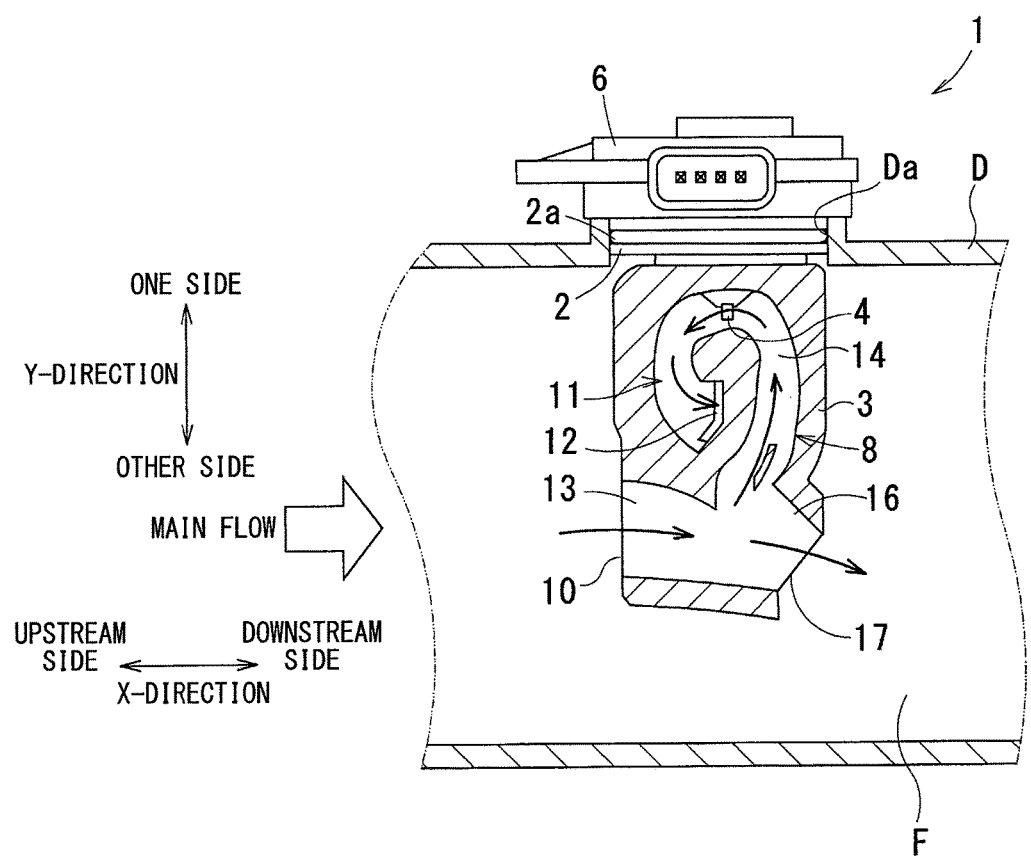
FIG. 1 is a partial cross-sectional diagram illustrating a flow rate meter according to a first embodiment.
Figure 2:
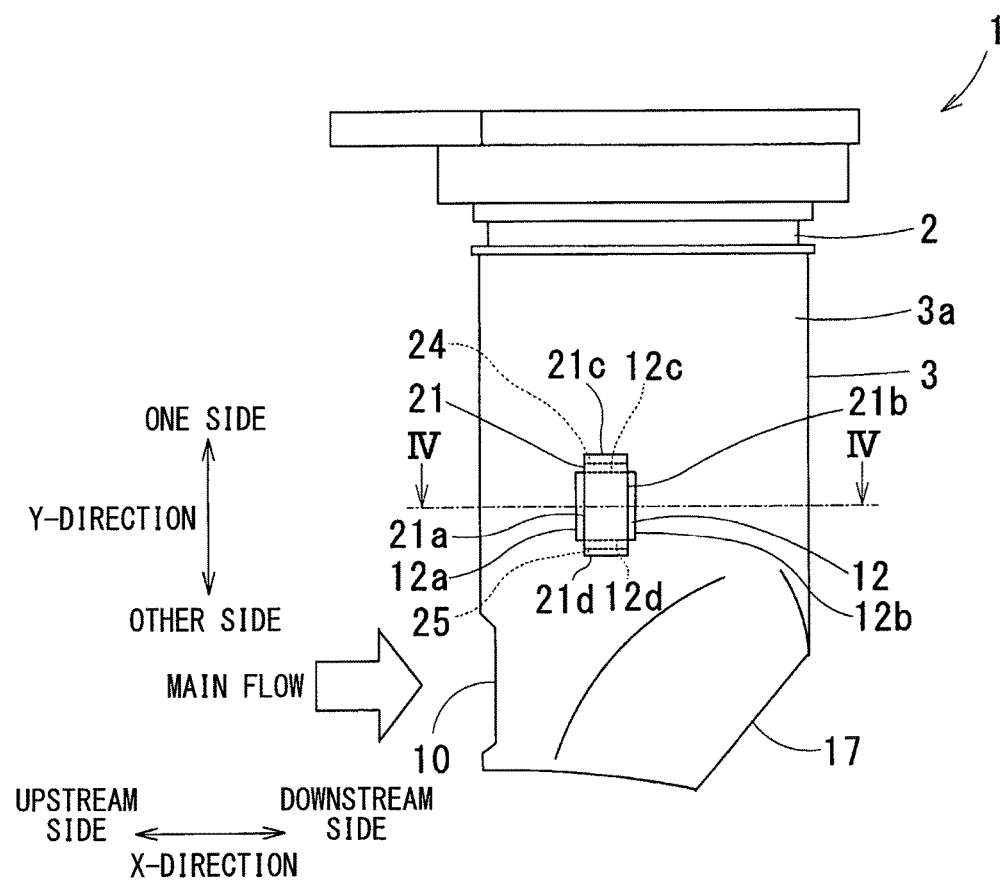
FIG. 2 is a plan diagram illustrating the flow rate meter when viewed from the other side in a direction Z, according to the first embodiment.

The engagement portion 2 has an outer surface that faces an inner surface of the attachment hole Da to engage with the attachment hole Da. The outer surface of the engagement portion 2 has a groove as shown in FIG. 2. An O-ring 2a is arranged in the groove to gas-tightly seal between the inner surface of the attachment hole Da and the outer surface of the engagement portion 2 as shown in FIG. 1.

The housing 3 protrudes from the engagement portion 2 into the duct D in a direction approximately perpendicular to a flow direction of air flowing in the duct D. In other words, the housing 3 protrudes from the engagement portion 2 into the duct D in a radial direction of the duct D that is approximately perpendicular to a main flow direction in which a main flow of air drawn into the engine flows in the intake passage F. A portion of the flow rate meter 1 protruding from the engagement portion 2 to an outside of the duct D includes a connector 6. Hereafter, the main flow direction is referred to as an X-direction, a direction in which the housing 3 protrudes is referred to as a Y-direction, and a direction that is perpendicular to both the X-direction and the Y-direction is referred to as a Z-direction.

The housing 3 is located adjacent to an inner wall (i.e., a passage wall) of the duct D and extends toward a center of the intake passage F that is defined by the duct D. The housing 3 therein defines a bypass path 8 in which a part of air (i.e., a part of a main flow) flowing in the duct D flows. The bypass passage 8 has an inlet 10, an inner path 11, and an outlet 12. A part of air flowing in the duct D flows into the bypass path 8 from the inlet 10. The inner path 11 delivers the air flowing from the inlet 10 to the outlet 12. The air flows out of the outlet 12 and returns into the duct D.

The inner path 11 has a suction portion 13 and a round portion 14. The suction portion 13 communicates with a downstream side of the inlet 10. The round portion 14 guides air (i.e., fluid), which flows from the suction portion 13 into the inner path 11, to the outlet 12 roundly in the housing 3.

The suction portion 13 is branched into two branched paths at a downstream end of the suction portion 13 such that one branched path connects to the round portion 14, and the other branched path connects to a dust emitting path 16. The dust emitting path 16 delivers a dust that is included in air from the inlet 10, such that the dust flows from the inlet 10 through a dust emitting port 17, which is defined at a downstream end of the dust emitting path 16, without flowing into the bypass path 8. A flow direction of air (i.e., fluid) flowing in the dust emitting path 16 via the suction portion 13 is approximately parallel with the main flow direction.

The round portion 14 guides fluid (i.e., air) flowing from the suction portion 13 to flow sequentially as follows: (i) flow toward one end side of the round portion 14 in the Y-direction; (ii) flow toward an upstream side in the round portion 14 in the main flow direction; (iii) flow toward an other end side of the round portion 14 in the Y-direction; and (iv) flow to the outlet 12 while flowing toward a downstream side in the main flow direction. Here, when it is said that air flows toward the one end side of the round portion 14 in the Y-direction, it may be explained in other words that the air flows radial outward in the radial direction of the duct D in the round portion 14, or that the air flows to a side adjacent to the engagement portion 2 in the round portion 14. Further, when it is said that the air flows toward the upstream side in the main flow direction, it may be explained in other words that the air flows in the round portion 14 in a direction opposite to the main flow direction, or that the air flows in a direction opposite to a direction in which air flows in the suction portion 13.

The housing 3 has an outer wall 3a that extends along the main flow direction and has a through-hole being opened in the outer wall 3a. The through-hole defines the outlet 12. Hereafter, the through-hole is referred to as the through-hole 12. The through-hole 12 is open in a direction perpendicular to the main flow direction. According to the present embodiment, the housing 3 has a generally rectangular outer-shape when viewed in the Y-direction. A part of the outer wall 3a that extends in the main flow direction defines a sidewall 3b of the housing 3 (see FIG. 4).

According to the present embodiment, since the housing 3 has a rectangular shape in cross section, the sidewall 3b has a flat surface extending parallel with the main flow direction. However, the sidewall 3b is a visible part of the outer wall 3a that is visible when viewed in the Z-direction and may have a curved surface or an inclined surface in cross section depending on a shape of the housing 3. The through-hole 12 can be provided in any portion of the outer wall 3a to be open in the direction perpendicular to the main flow direction as long as the portion is visible when viewed in the Z-direction.

Figure 4:
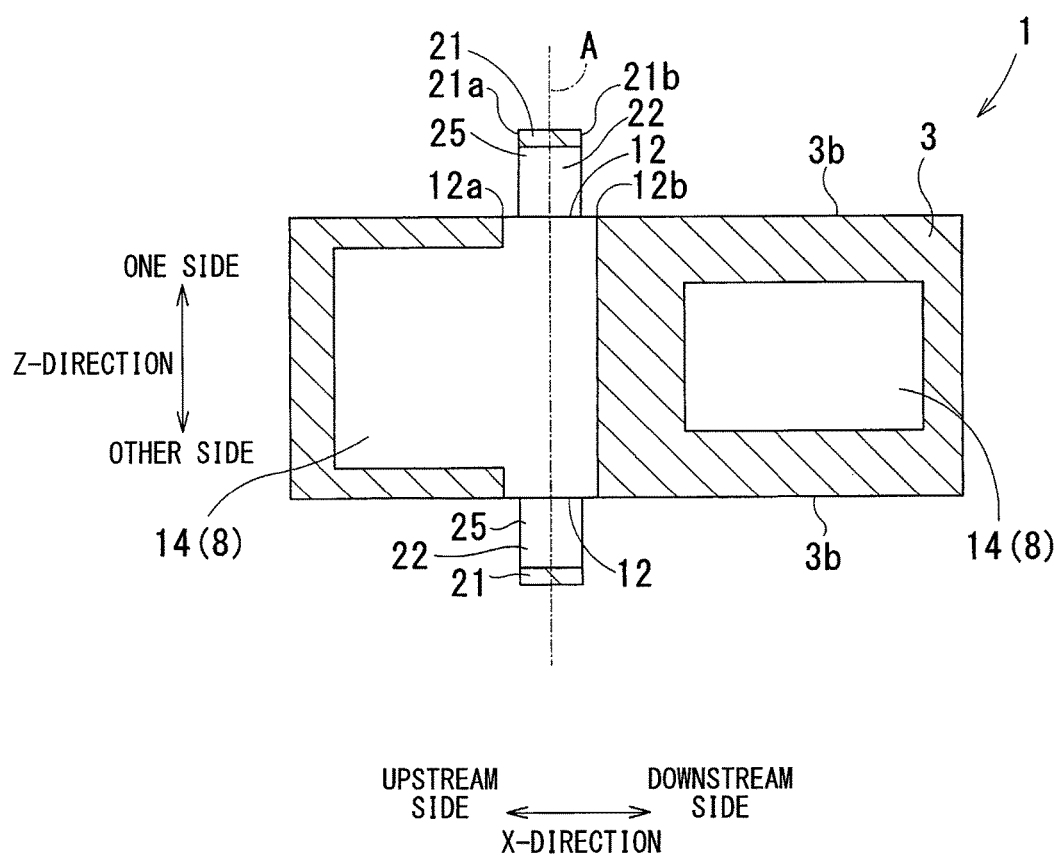
FIG. 4 is a cross-sectional diagram illustrating the flow rate meter taken along a line IV-IV of FIG. 2 according to the first embodiment.

The through-hole 12 is open at the sidewall 3b on both sides of the housing 3 in the Z-direction, in other words, on both one side and the other side of the housing 3 in the Z-direction as shown in FIG. 4. The main flow flows along the housing 3 on the both sides of the housing 3. According to the present embodiment, the sidewall 3b has a wall portion extending perpendicular to the main flow direction, and the through-hole 12 is open in the wall portion. The through-hole 12 has a rectangular shape according to the present embodiment. Air flowing out from the through-hole 12 joins the main flow.

The flow rate sensor 4 outputs an electric signal (e.g., a voltage signal) depending on a flow rate of air flowing in the bypass path 8. Specifically, the flow rate sensor 4 has a heat generating element and a thermosensitive element that are made of a thin-film resistor, and the heat generating element and the thermosensitive element are located on a membrane provided in a semiconductor substrate. The heat generating element and the thermosensitive element are connected to a circuit board (not shown) that is built in a circuit module. The flow rate sensor 4 is housed in the round portion 14. Specifically, the flow rate sensor 4 is located at a position in the round portion 14 where the air flows in the direction opposite to the flow direction of air flowing in the suction portion 13. That is, the flow rate sensor 4 detects a flow rate of air flowing in the bypass path 8.

Figure 3:
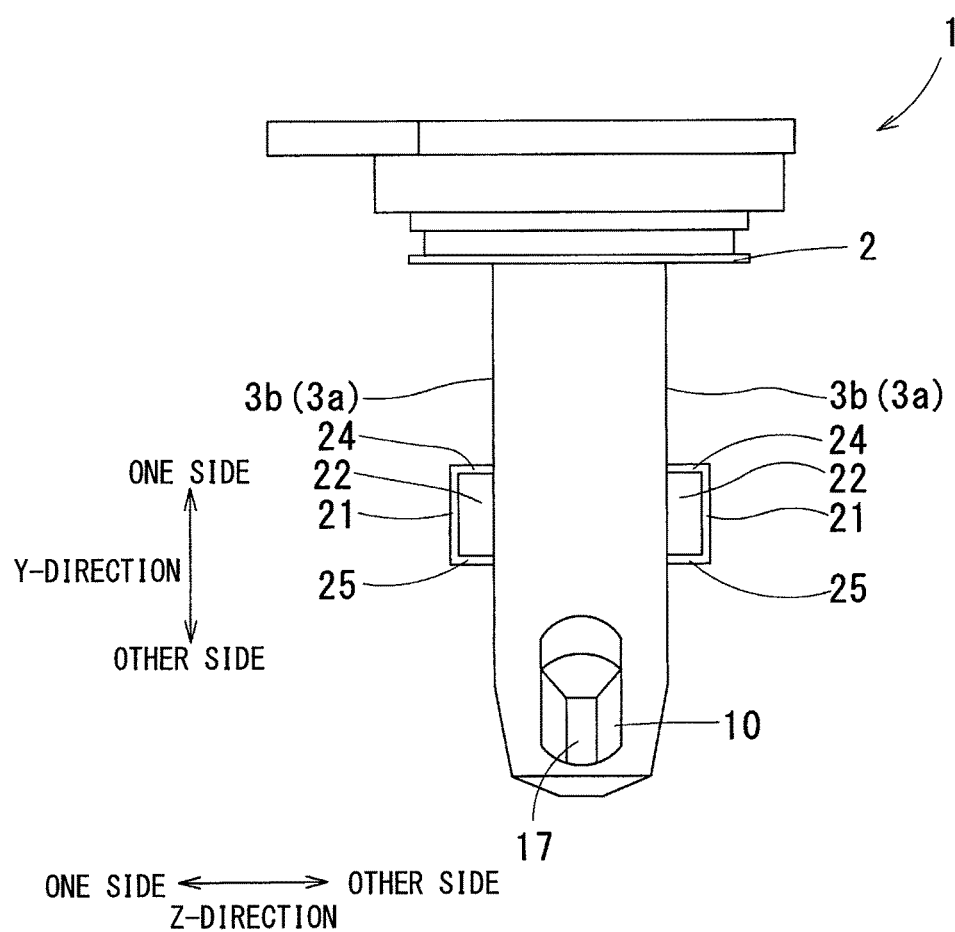
FIG. 3 is a plan diagram illustrating the flow rate meter when viewed from an upstream side in an X-direction, according to the first embodiment.

The first embodiment will be further described in detail referring to FIGS. 2 to 4. FIG. 4 is a sectional view of the housing 3 at a cross section that is perpendicular to the Y-direction and includes the outlet 12. In the present embodiment, the main flow direction is a base direction based on which an upstream side and a downstream side are defined. Hereafter, the upstream side in the main flow direction will be simply referred to as the upstream side, and the downstream side in the main flow direction will be simply referred to as the downstream side.

The flow rate meter 1 of the present embodiment has a plate member 21. The plate member 21 has a rectangular shape in cross section perpendicular to the Y-direction. The plate member 21 is arranged to face a portion of the sidewall 3b in which the through-hole 12 is defined. That is, the plate member 21 is arranged to face the through-hole 12 in the Z-direction and to be distanced from the sidewall 3b in the Z-direction. That is, a space 22 is defined between the plate member 21 and the sidewall 3b such that the space 22 functions as a passage in which a part of the main flow flowing outside of the housing 3 flows. The main flow flowing outside of the housing 3 is, in other words, a flow of air that does not flow in the bypass path 8. Accordingly, a part of air flowing outside of the housing 3 without flowing in the bypass path 8 flows into the space 22.

The plate member 21 is arranged parallel with the sidewall 3b. That is, the plate member 21 is arranged such that a thickness direction of the plate member 21 is approximately perpendicular to a wall surface of the sidewall 3b. The plate member 21 is located to face the through-hole 12. That is, the plate member 21 intersects with a center line A that passes through a center of the through-hole 12 and is perpendicular to the main flow direction. In other words, the plate member 21 is located such that the center line A passes through the plate member 21.

More specifically, the plate member 21 has an upstream end 21a and a downstream end 21b. The upstream end 21a is located on an upstream side of the center line A, and the downstream end 21b is located on a downstream side of the center line A.

According to the present embodiment, as shown in FIG. 4, the upstream end 21a is located on the upstream side of the center line A and on a downstream side of an upstream end 12a of the through-hole 12. The downstream end 21b is located on the downstream side of the center line A and on an upstream side of a downstream end 12b of the through-hole 12. That is, a length of the plate member 21 in the main flow direction is shorter than a length between the upstream end 12a and the downstream end 12b of the through-hole 12 in the main flow direction. The plate member 21 is located between the upstream end 12a and the downstream end 12b of the through-hole 12 in the main flow direction. In addition, as shown in FIG. 2, the plate member 21 has one end 21c and the other end 21d in the Y-direction, and the through-hole 12 has one end 12c and the other end 12d in the Y-direction. When one side of the Y-direction is defined as a side adjacent to the engagement portion 2, the one end 21c of the plate member 21 is located on the one side of the one end 12c of the through-hole 12 in the Y-direction. When the other side of the Y-direction is defined as an opposite side of the one side, the other end 21d of the plate member 21 is located on the other side of the other end 12d of the through-hole 12. In other words, the one end 21c of the plate member 21 is located between the engagement portion 2 and the one end 12c of the through-hole 12 in the Y-direction, and the other end 21d is located between the other end 12d and the inlet 10 in the Y-direction.

As shown in FIG. 3, protruding portions 24, 25 protrude from the sidewall 3b on both sides of the sidewall 3b in the Z-direction. The protruding portion 24 and the protruding portion 25 are distanced from each other in the Y-direction. The plate member 21 is located between the protruding portion 24 and the protruding portion 25 in the Y-direction to connects to both the protruding portion 24 and the protruding portion 25. The through-hole 12 is located between the protruding portion 24 and the protruding portion 2 in the Y-direction. That is, the space 22 is defined between the plate member 21 and the sidewall 3b in the Z-direction, and defined between the protruding portion 24 and the protruding portion 25 in the Y-direction. In other words, the space 22 is surrounded by the plate member 21, the sidewall 3b, and the protruding portions 24, 25 and provides the passage into which the part of air flowing outside of the housing 3 flows.

According to the present embodiment, each of the protruding portions 24, 25 has a plate shape of which thickness direction is coincident with the Y-direction. The each of the protruding portions 24, 25 protrudes in the Z-direction and extends parallel with the X-direction as shown in FIGS. 2 and 3. As shown in FIG. 2, an end of the protruding portion 24 in the Y-direction is located on the one side of the one end 12c of the through-hole 12 in the Y-direction. An end of the protruding portion 25 in the Y-direction is located on the other side of the other end 12d of the through-hole 12 in the Y-direction.

According to the present embodiment, the length of the plate member 21 in the main flow direction is equal to a length of the protruding portions 24, 25 in the main flow direction. A position of the upstream end 21a of the plate member 21 and a position of an upstream end of the protruding portions 24, 25 are coincident with each other in the main flow direction. A position of the downstream end 21b of the plate member 21 and a position of a downstream end of the protruding portions 24, 25 are coincident with each other in the main flow direction.

Effects of the first embodiment will be described hereafter.

The flow rate meter 1 has the plate member 21. The plate member 21 is arranged to be parallel with the sidewall 3b of the housing 3 and to intersect with the center line A that passes through the center of the through-hole 12 and is perpendicular to the main flow direction. The space 22 is defined between the plate member 21 and the sidewall 3b, and the part of the main flow flowing outside of the housing 3 flows in the space 22.

Accordingly, the plate member 21 can change a flow direction of air flowing out of the bypass path 8 from the through-hole 12 to a direction parallel with the sidewall 3b. That is, the flow direction of the air flowing from the through-hole 12 is changed by the plate member 21 to a direction in which the air joins the main flow smoothly. As a result, the air flowing out of the bypass path 8 from the through-hole 12 smoothly joins the main flow flowing in the space 22 between the sidewall 3b and the plate member 21 and flows to the downstream side.

Therefore, a flow of the air flowing out of the bypass path 8 from the outlet 12 can flow along the housing 3 together with the main flow, and a flow separation that occurs when the air from the outlet 12 joins the main flow can be reduced. That is, a flow of air separates hardly from the sidewall 3b on a downstream side of a portion of the sidewall 3b in which the through-hole 12 is defined.

Figure 5:
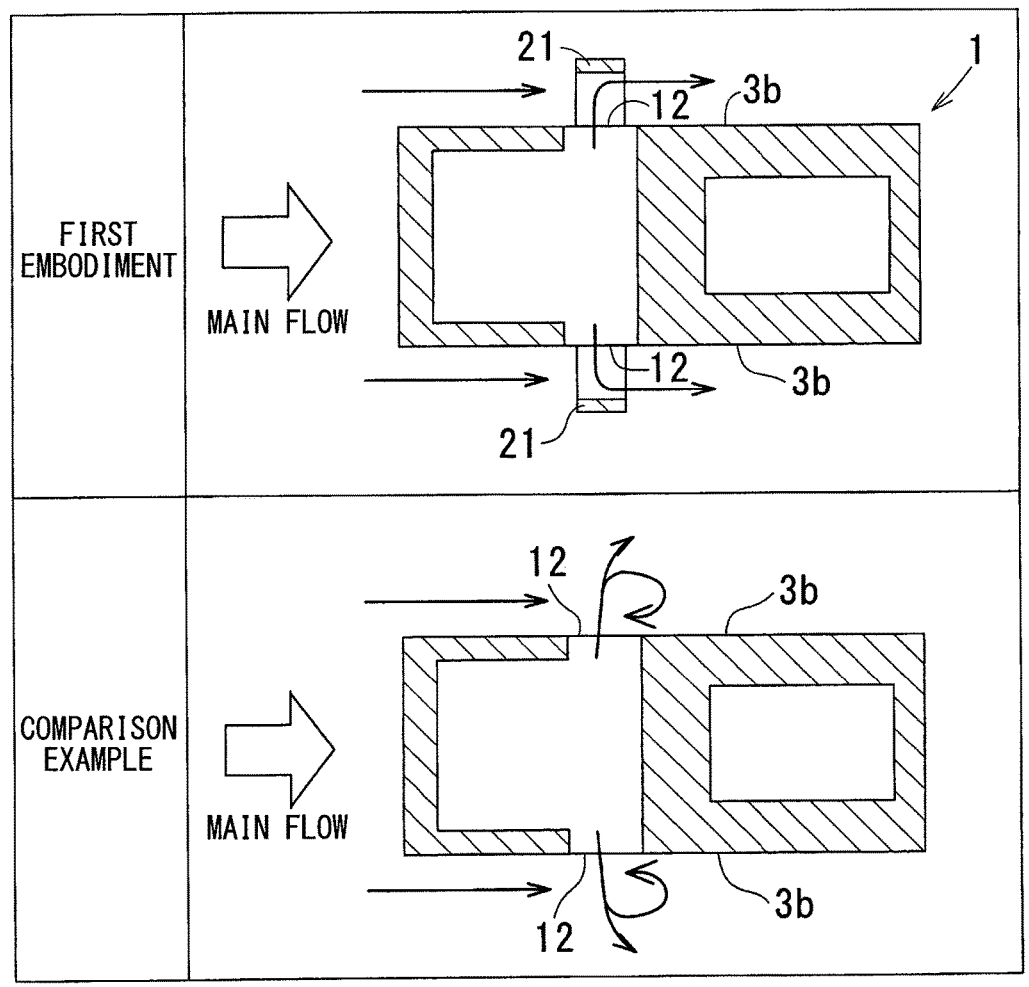
FIG. 5 is a diagram for explaining an effect of the first embodiment.

FIG. 5 illustrates how the flow separation is restricted according to the first embodiment as compared to a comparison example that has no plate member 21. According to the comparison example, air from the outlet 12 hardly flows along the sidewall 3b when joining the main flow and flows in a direction perpendicular to the main flow direction. As a result, the air separation occurs. When the air separation occurs, a vortex occurs around the outlet 12 or on the downstream side of the outlet 12, and an accuracy of flow measurement may deteriorate.

On the other hand, according to the first embodiment, the air from the outlet 12 flows along the center line A that is perpendicular to the main flow direction right after flowing out from the outlet 12. However, the air from the outlet 12 collides with the plate member 21, and the flow direction of the air is changed to flow along the plate member 21. That is, the plate member 21 functions as a guide plate that guides the air from the outlet 12 to flow to the downstream side in the main flow direction. Accordingly, the air smoothly joins the main flow passing through the space 22 and flows along the sidewall 3b together with the main flow. Therefore, the flow separation occurs hardly.

Second Embodiment

Figure 6:
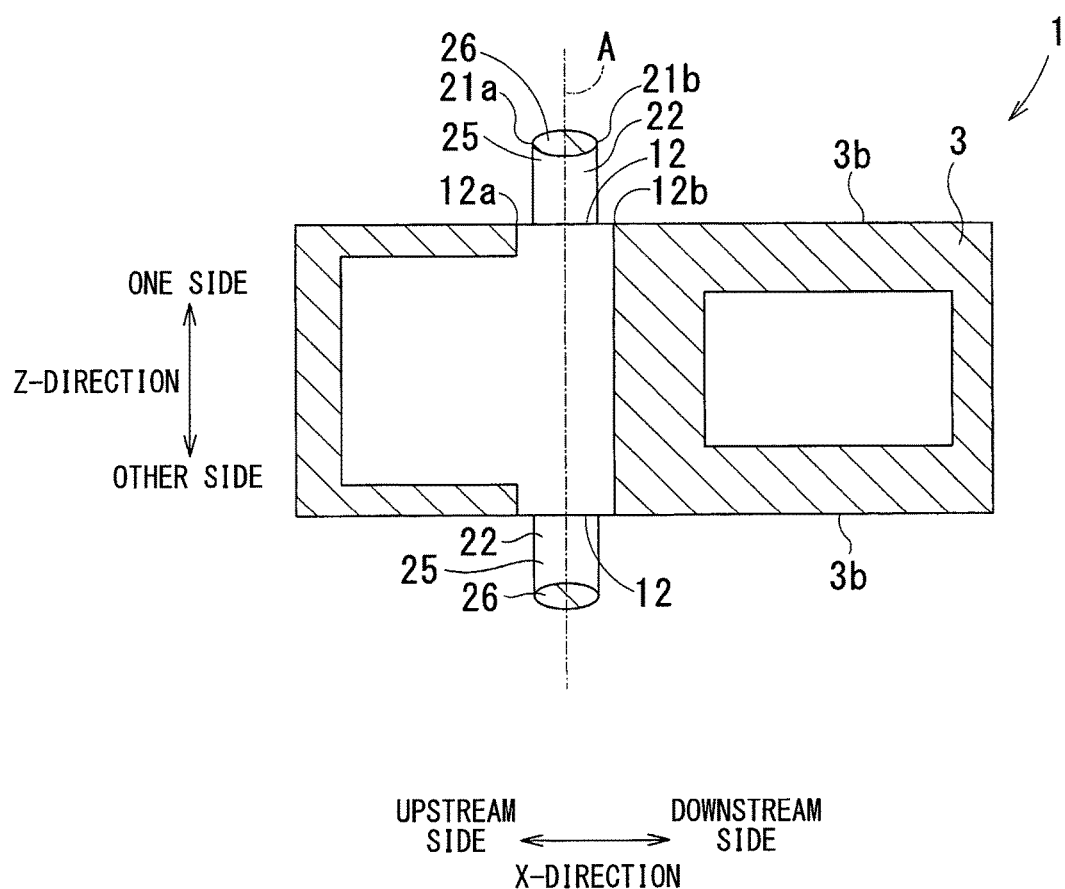
FIG. 6 is a partial cross-sectional diagram illustrating a flow measurement device according to a second embodiment.

A second embodiment will be described referring to FIG. 6. In the following description, features that are different from the first embodiment will be described.

According to the present embodiment, a plate member 26 has a different shape as compared with the plate member 21 in cross section perpendicular to the Y-direction. Specifically, the plate member 26 has an ellipse shape in cross section perpendicular to the Y-direction. However, the plate member 26 may have another shape such as polygonal shape, a wing shape, or a streamline shape in the cross section. According to the present embodiment, a similar effect as the first embodiment can be acquired.

Third Embodiment

Figure 7:
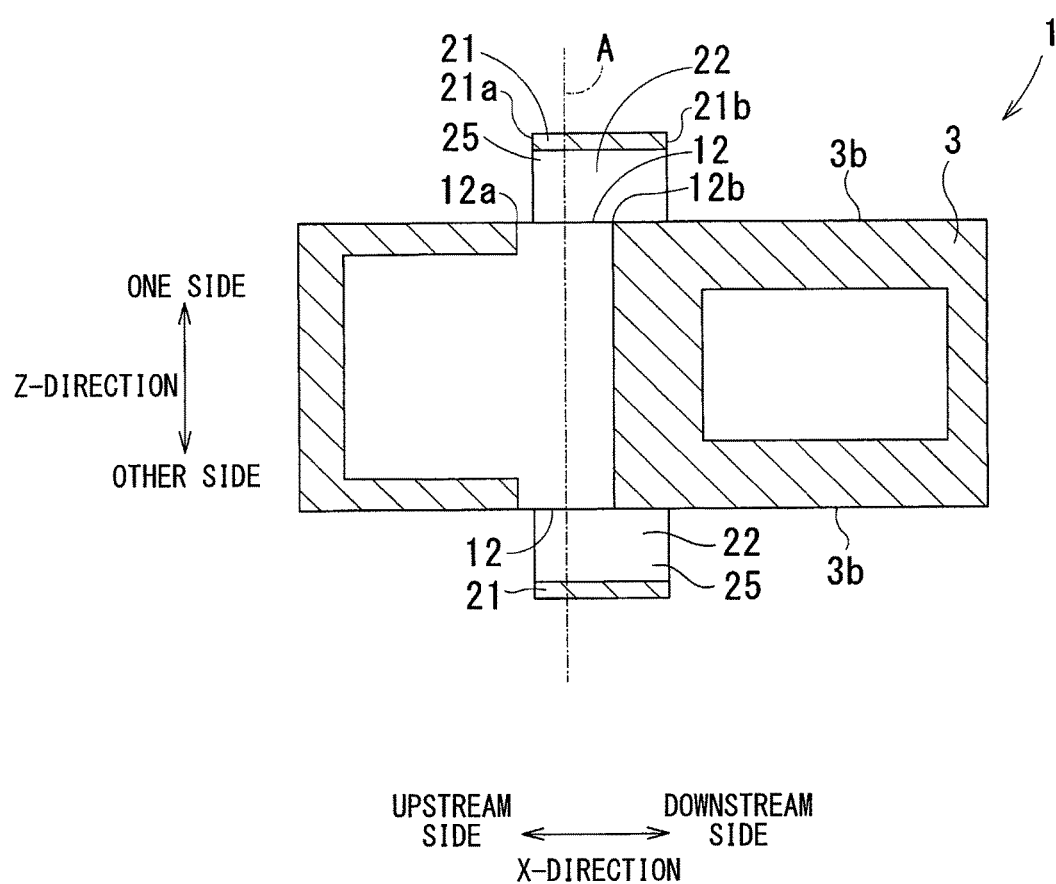
FIG. 7 is a partial cross-sectional diagram illustrating a flow measurement device according to a third embodiment.

A third embodiment will be described referring to FIG. 7. In the following description, features that are different from the first embodiment will be described.

According to the present embodiment, the downstream end 21b of the plate member 21 is located on the downstream side of the downstream end 12b of the through-hole 12. According to the present embodiment, a similar effect as the first embodiment can be acquired. Furthermore, the function of the plate member 21 as the guide plate can be improved, and the flow separation can be reduced more effectively, as compared to the first embodiment.

Fourth Embodiment

Figure 8:
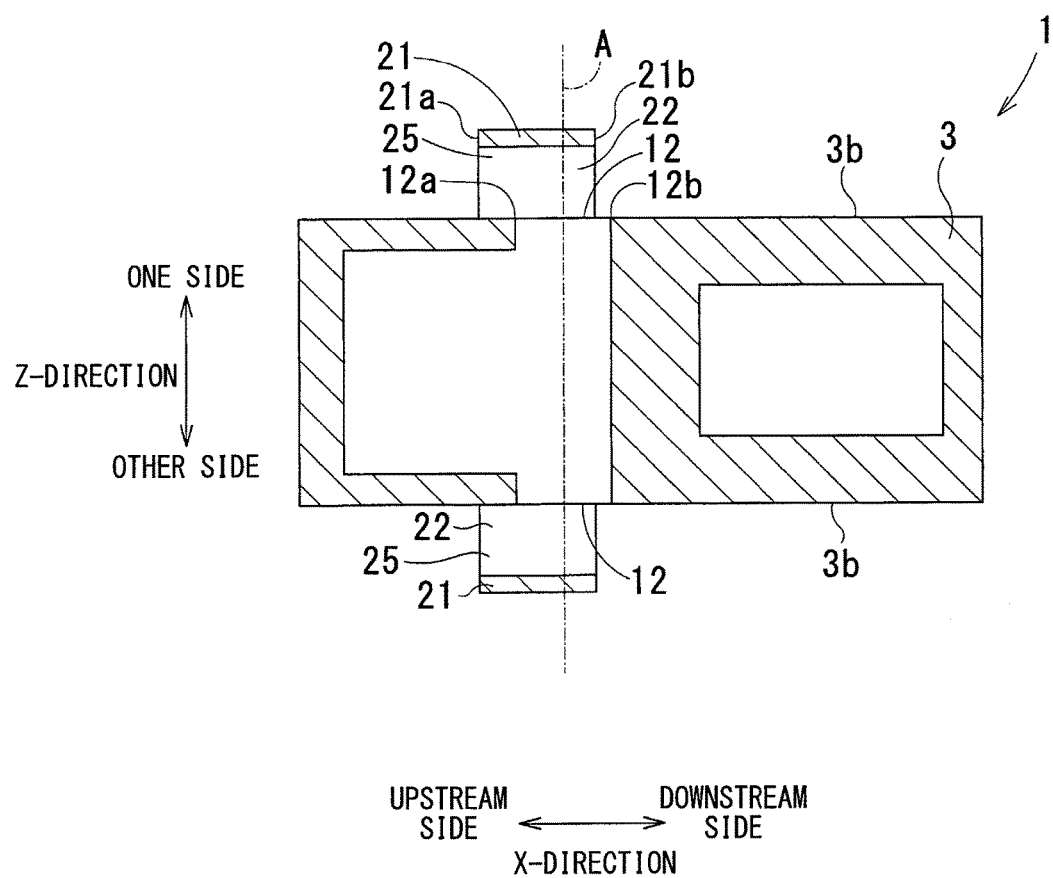
FIG. 8 is a partial cross-sectional diagram illustrating a flow measurement device according to a fourth embodiment.

A fourth embodiment will be described referring to FIG. 8. In the following description, features that are different from the first embodiment will be described.

According to the present embodiment, the upstream end 21a of the plate member 21 is located on the upstream side of the upstream end 12a of the through-hole 12. According to the present embodiment, a similar effect as the first embodiment can be acquired. Furthermore, a flow of air flowing into the space 22 from the upstream side of the through-hole 12 can be straightened.

Fifth Embodiment

Figure 9:
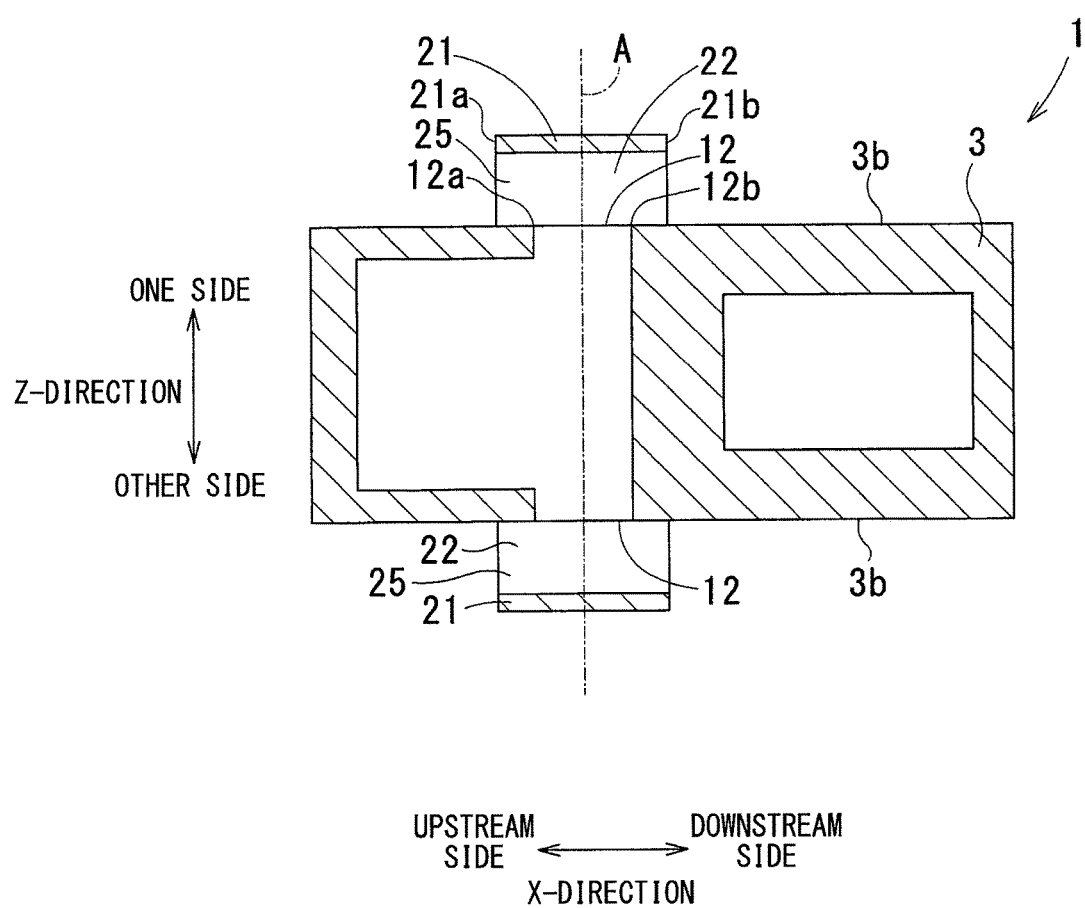
FIG. 9 is a partial cross-sectional diagram illustrating a flow measurement device according to a fifth embodiment.

A fifth embodiment will be described referring to FIG. 9. In the following description, features that are different from the first embodiment will be described.

According to the first and second embodiments, both the upstream end 21a and the downstream end 21b of the plate member 21 are located between the upstream end 12a and the downstream end 12b of the through-hole 12 in the main flow direction. According to the third and fourth embodiments, at least one of the upstream end 21a and the downstream end 21b of the plate member 21 are located between the upstream end 12a and the downstream end 12b of the through-hole 12 in the main flow direction.

According to the present embodiment, the upstream end 21a of the plate member 21 is located on the upstream side of the upstream end 12a of the through-hole 12a, and the downstream end 21b of the plate member 21 is located on the downstream side of the downstream end 12b of the through-hole 12. According to the present embodiment, a similar effect as the first embodiment can be acquired. Furthermore, the flow of air flowing into the space 22 from the upstream side of the through-hole 12 can be straightened, and the function of the plate member 21 as the guide plate can be improved, and the flow separation can be reduced more effectively, as compared to the first embodiment.

Other Modification

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

Figure 10:
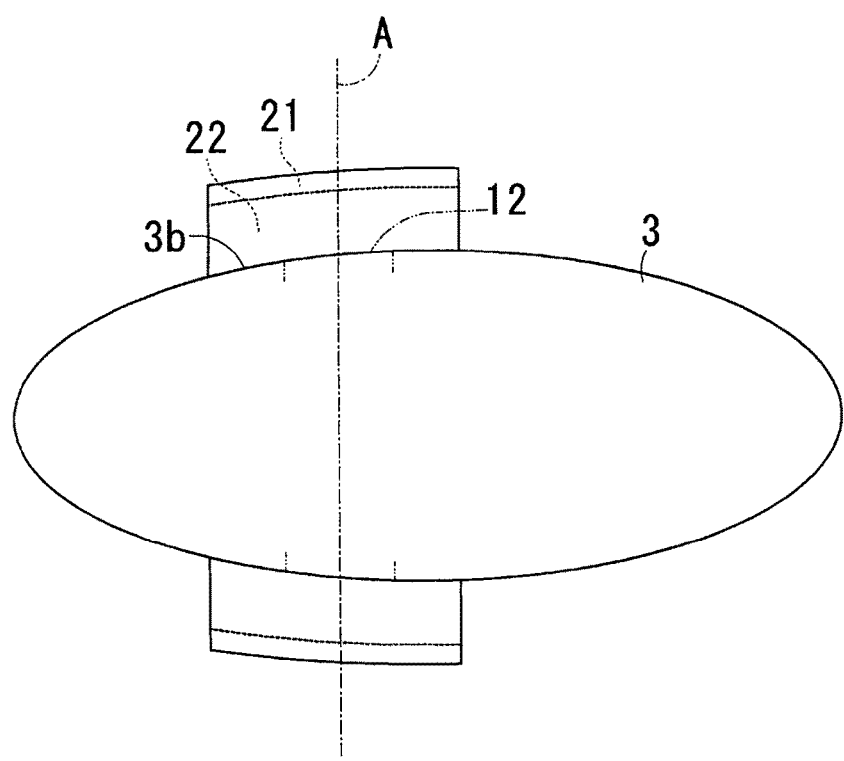
FIG. 10 is a plan diagram illustrating the flow rate meter when viewed in a Y-direction, according to a modification example.

According to the above-described embodiments, the housing 3 has a generally rectangular outer-shape when viewed in the Y-direction. However, the outer shape of the housing 3 is not limited to the rectangular shape and may be another shape. For example, the outer shape of the housing may be an ellipse shape as shown in FIG. 10, a polygonal shape, or a streamline shape. In a case of a modification example shown in FIG. 10, the plate member 21 and the sidewall 3b can be arranged parallel with each other by forming the plate shape 21 in an arc shape that corresponds to an arc shape of the sidewall 3b facing the plate shape 21.

According to the above-described embodiments, the length of the plate member in the main flow direction and the length of the protruding portions 24, 25 in the main flow direction are equal to each other. However, the length of the plate member may be longer than the length of the protruding portions 24, 25 in the main flow direction. Alternatively, the length of the protruding portions 24, 25 may be longer than the length of the plate member in the main flow direction.

According to the above-described embodiments, the bypass path 8 includes the inner path 11 having the round portion 14. However, the bypass path 8 may have a configuration into which a part of the main flow flows and which guides the part of the main flow to flow not round in the housing 3. In this case, the inlet 10 and the outlet 12 of the bypass path 8 may be arranged in a line in the main flow direction, and the part of the main flow flows from the inlet 10 through the outlet 12 in the main flow direction.

Such changes and modifications are to be understood as being within the scope of the present disclosure as defined by the appended claims.

What is claimed is:

1. A flow rate meter comprising:
a housing that is arranged in an intake passage in which a main flow of air drawn into an internal combustion engine flows, the housing defines an air passage that includes an outlet port, and the housing defines a bypass path that is branched off from the air passage on an upstream side of the outlet port and in which a part of the main flow flows;
a flow rate sensor that is arranged in the bypass path, wherein
the main flow flows in the intake passage in a main flow direction,
the housing has a sidewall that is an outer wall, and the sidewall is arranged to extend along the main flow direction,
the main flow direction is a base direction based on which an upstream side and a downstream side are defined,
the bypass path has an outlet in the form of a through-hole that is in the sidewall and open in a direction approximately perpendicular to the main flow direction;
a plate member that is arranged to face the sidewall and defines a space into which a part of the main flow flowing outside of the housing flows, and the space is located between the sidewall and the plate member, wherein the plate member is arranged parallel with the sidewall and intersects with a center line that is perpendicular to the main flow direction and passes through a center of the through-hole; and
a second outlet in the housing, wherein the outlet and the second outlet are open in different directions, wherein
the outlet port is spaced away from the outlet and the second outlet along a direction that is approximately perpendicular to both the direction in which the outlet is open and the main flow direction, and
the outlet port does not overlap the outlet and the second outlet in the direction that is approximately perpendicular to both the direction in which the outlet is open and the main flow direction.

2. The flow rate meter according to claim 1, wherein
the through-hole has an upstream end and a downstream end in the main flow direction,
the plate member has an upstream end and a downstream end in the main flow direction,
the upstream end of the plate member is located on an upstream side of the upstream end of the through-hole in the main flow direction, and
the downstream end of the plate member is located on a downstream side of the downstream end of the through-hole in the main flow direction.

3. The flow rate meter according to claim 1, wherein
the through-hole has an upstream end and a downstream end in the main flow direction,
the plate member has an upstream end and a downstream end in the main flow direction, and
at least one of the upstream end and the downstream end of the plate member are located between the upstream end and the downstream end of the through-hole in the main flow direction.

4. The flow rate meter according to claim 1, wherein the different directions are opposite directions.

5. The flow rate meter according to claim 1, wherein a portion of the plate member closest to the outlet port is spaced away from the outlet port along the direction that is approximately perpendicular to both the direction in which the outlet is open and the main flow direction.

6. The flow rate meter according to claim 1, wherein the space into which the part of the main flow flowing outside of the housing flows includes an upstream opening and a downstream opening that are the same size.

7. A flow rate meter comprising:
a housing that is arranged in an intake passage in which a main flow of air drawn into an internal combustion engine flows in a main flow direction, and the housing has a sidewall extending in the main flow direction and defining an outer wall of the housing,
an air passage that is defined by the housing and includes an outlet port;
a bypass path that is branched off from the air passage on an upstream side of the outlet port is defined in the housing and in which a part of the main flow flows; and
a plate member that is arranged to face the sidewall and defines a space between the sidewall and the plate member and a part of the main flow flowing outside of the housing flows into the space, wherein
the housing has an outlet of the bypass path in the form of a through-hole that is open at the sidewall in an opening direction approximately perpendicular to the main flow direction,
the housing has a second outlet, wherein the outlet and the second outlet are open in different directions,
the plate member is arranged parallel with the sidewall and intersects with an axis of the through-hole,
the outlet port is spaced away from the outlet and the second outlet along a direction that is approximately perpendicular to both the opening direction and the main flow direction, and
the outlet port does not overlap the outlet and the second outlet in the direction that is approximately perpendicular to both the opening direction and the main flow direction.

8. The flow rate meter according to claim 7, wherein the different directions are opposite directions.

9. The flow rate meter according to claim 7, wherein a portion of the plate member closest to the outlet port is spaced away from the outlet port along the direction that is approximately perpendicular to both the opening direction and the main flow direction.

10. The flow rate meter according to claim 7, wherein the space between the sidewall and the plate member includes an upstream opening and a downstream opening that are the same size.

11. A flow rate meter comprising:
a housing that is arranged in an intake passage in which a main flow of air drawn into an internal combustion engine flows, the housing defines an air passage that includes an outlet port, and the housing defines a bypass path that is branched off from the air passage on an upstream side of the outlet port and in which a part of the main flow flows;
a flow rate sensor that is arranged in the bypass path, wherein
the main flow flows in the intake passage in a main flow direction,
the housing has a sidewall that is an outer wall, and the sidewall is arranged to extend along the main flow direction,
the main flow direction is a base direction based on which an upstream side and a downstream side are defined, the bypass path has an outlet in the form of a through-hole that is in the sidewall and open in a direction approximately perpendicular to the main flow direction;

a plate member that is arranged to face the sidewall and defines a space into which a part of the main flow flowing outside of the housing flows, and the space is located between the sidewall and the plate member, wherein the plate member is arranged parallel with the sidewall and intersects with a center line that is perpendicular to the main flow direction and passes through a center of the through-hole; and a second plate member that is arranged to face a second sidewall, wherein the second plate member is arranged parallel with the second sidewall and intersects with a center line of a second through-hole, wherein the outlet port is spaced away from the through-hole and the second through-hole along a direction that is approximately perpendicular to both the center line and the main flow direction, and the outlet port does not overlap the through-hole and the second through-hole in the direction that is approximately perpendicular to both the center line and the main flow direction.

12. The flow rate meter according to claim 11, wherein the through-hole and the second through-hole are open in different directions.

13. The flow rate meter according to claim 12, wherein the different directions are opposite directions.

14. The flow rate meter according to claim 11, wherein a portion of the plate member closest to the outlet port is spaced away from the outlet port along the direction that is approximately perpendicular to both the center line and the main flow direction.

15. The flow rate meter according to claim 11, wherein the space into which the part of the main flow flowing outside of the housing flows includes an upstream opening and a downstream opening that are the same size.

16. A flow rate meter comprising:

a housing that is arranged in an intake passage in which a main flow of air drawn into an internal combustion engine flows in a main flow direction, and the housing has a first sidewall and a second sidewall both extending in the main flow direction and defining an outer walls of the housing, an air passage that is defined by the housing and includes an outlet port;

a bypass path that is branched off from the air passage on an upstream side of the outlet port is defined in the housing and in which a part of the main flow flows;

a first plate member that is arranged to face the first sidewall and defines a first space between the first sidewall and the first plate member and a first part of the main flow flowing outside of the housing flows into the first space; and a second plate member that is arranged to face the second sidewall and defines a second space between the second sidewall and the second plate member and a second part of the main flow flowing outside of the housing flows into the second space, wherein the housing has a first outlet of the bypass path in the form of a first through-hole that is open at the first sidewall in a first direction approximately perpendicular to the main flow direction, the first plate member is arranged parallel with the first sidewall and intersects with a central axis of the first through-hole, the housing has a second outlet of the bypass path in the form of a second through-hole that is open at the second sidewall in a second direction approximately perpendicular to the main flow direction, the second plate member is arranged parallel with the second sidewall and intersects with a central axis of the second through-hole, the outlet port is spaced away from the first outlet and the second outlet along a direction that is approximately perpendicular to both the first direction and the main flow direction, and the outlet port does not overlap the first outlet and the second outlet along the direction that is approximately perpendicular to both the first direction and the main flow direction.

17. The flow rate meter according to claim 16, wherein the first through-hole and the second through-hole are open in different directions.

18. The flow rate meter according to claim 17, wherein the different directions are opposite directions.

19. The flow rate meter according to claim 16, wherein a portion of the first plate member closest to the outlet port is spaced away from the outlet port along the direction that is approximately perpendicular to both the first direction and the main flow direction.

20. The flow rate meter according to claim 16, wherein the first space includes an upstream opening and a downstream opening that are the same size.

* * * * *